United States Patent
Kira et al.

(10) Patent No.: US 8,607,816 B2
(45) Date of Patent: Dec. 17, 2013

(54) STRUCTURE OF SOLENOID VALVE ATTACHED TO RESIN COVER BY INSERT-MOLDING

(75) Inventors: Naoki Kira, Nagoya (JP); Atsushi Nishigaki, Anjo (JP); Takahiro Inokuchi, Chiryu (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 711 days.

(21) Appl. No.: 12/716,652

(22) Filed: Mar. 3, 2010

(65) Prior Publication Data

US 2010/0243934 A1    Sep. 30, 2010

(30) Foreign Application Priority Data

Mar. 25, 2009  (JP) ................................. 2009-074107
Aug. 31, 2009  (JP) ................................. 2009-200213

(51) Int. Cl.
*F16L 3/00* (2006.01)
*F16K 27/00* (2006.01)
*F02B 77/00* (2006.01)

(52) U.S. Cl.
USPC ........... 137/375; 137/343; 251/366; 251/368; 123/195 C

(58) Field of Classification Search
USPC ........ 137/343, 375; 251/366, 368; 123/90.15, 123/90.17, 90.31, 195 C; 156/293
See application file for complete search history.

(56) References Cited

U.S. PATENT DOCUMENTS 3,692,335 A *  9/1972  Vickers et al. .................. 285/49
5,058,932 A * 10/1991  Mackal .......................... 285/200
5,058,933 A * 10/1991  Mackal .......................... 285/200
5,080,402 A *  1/1992  Mackal .......................... 285/200
6,810,842 B2  11/2004  Itou
6,832,587 B2 * 12/2004  Wampula et al. ........... 123/90.38
7,121,243 B2  10/2006  Yoshijima et al.
7,174,868 B2 *  2/2007  Yoshijima et al. ......... 123/90.38
7,560,153 B2   7/2009  Takanashi
2005/0175400 A1  8/2005  Behr et al.

(Continued)

FOREIGN PATENT DOCUMENTS

AT          382 222 B     1/1987
CN          100417508     9/2008

(Continued)

OTHER PUBLICATIONS

Extended European Search Report issued by the European Patent Office in EP Patent Application No. 10 00 2329, Aug. 12, 2010, Munich, DE.

(Continued)

*Primary Examiner* — John Fox
*Assistant Examiner* — Kevin Murphy
(74) *Attorney, Agent, or Firm* — Buchanan Ingersoll & Rooney PC

(57) ABSTRACT

A structure of a solenoid valve attached to a resin cover by insert-molding, the solenoid valve includes a valve body having a cylindrical shape and at least two fluid passages, a spool housed in the valve body and slidable therein in an axial direction relative to the valve body, a solenoid for actuating the spool, wherein a plurality of flanges is provided on an outer peripheral surface of the valve body, and at least one of the flanges has a through hole formed in the axial direction relative to the valve body.

16 Claims, 4 Drawing Sheets

(56) References Cited

U.S. PATENT DOCUMENTS

| | | |
|---|---|---|
| 2006/0112916 A1 | 6/2006 | Yoshijima et al. |
| 2007/0045968 A1 | 3/2007 | Long |
| 2009/0044773 A1* | 2/2009 | Hu et al. .................. 123/90.38 |

FOREIGN PATENT DOCUMENTS

| | | |
|---|---|---|
| DE | 103 59 785 A1 | 7/2005 |
| DE | 20 2006 011 672 U1 | 12/2007 |
| JP | 11-311352 | 11/1999 |
| JP | 2001-227667 | 8/2001 |
| JP | 3525709 B2 | 2/2004 |
| JP | 2006-029166 A | 2/2006 |
| JP | 2006-064158 A | 3/2006 |
| JP | 2006-152969 | 6/2006 |
| JP | 2007-107479 A | 4/2007 |

OTHER PUBLICATIONS

Chinese Office Action issued on Jun. 20, 2013 by Chinese Patent Office in corresponding Chinese Patent Application No. 201010127027, and English translation thereof.

Japanese Office Action issued on Jul. 31, 2013 by the Japan Patent Office in corresponding Japanese Patent Application No. 2009-200213, and English translation thereof.

* cited by examiner

STRUCTURE OF SOLENOID VALVE ATTACHED TO RESIN COVER BY INSERT-MOLDING

CROSS REFERENCE TO RELATED APPLICATIONS

This application is based on and claims priority under 35 U.S.C. §119 to Japanese Patent Application 2009-074107, filed on Mar. 25, 2009, and Japanese Patent Application 2009-200213, filed on Aug. 31, 2009, the entire contents of which are incorporated herein by reference.

TECHNICAL FIELD

This disclosure relates to a structure of a solenoid valve attached to a resin cover by insert-molding. More particularly, this disclosure pertains to a structure of a solenoid valve attached to a resin cover by insert-molding provided in, for example, an internal combustion engine.

BACKGROUND DISCUSSION

In a known attachment structure of an oil control valve disclosed in JP2006-29166A (Reference 1), a metal sleeve (corresponding to a valve body and a sleeve of this disclosure) and a resin valve casing (corresponding to a cover of this disclosure) are integrally insert-molded and attached to each other. More particularly, a primer is applied on an outer peripheral surface of the metal sleeve before the insert-molding operation so that the metal sleeve is attached to a resin material that forms the valve casing.

However, in the attachment structure of the oil control valve (corresponding to a solenoid valve of this disclosure) disclosed in the Reference 1, no countermeasure is disclosed against heat deformation that may occur due to a difference in thermal expansion coefficients between different materials, for example, the materials of the metal sleeve and the resin valve casing. Thus, when the metal sleeve and the resin valve casing are integrally insert-molded, the resin cover may be thermally deformed or deteriorate due to heat of a fluid or heat conducted from an internal combustion engine, thereby causing a gap between the sleeve and the valve casing, which may result in unintentional fluid communication between two oil holes (corresponding to two fluid passages of this disclosure). Particularly, when the difference in the thermal expansion coefficient between the different materials exists, for example, the metal sleeve and the resin valve casing, the resin valve casing may come apart from the metal sleeve, and thus the unintentional fluid communication between the two oil holes may be established.

A need thus exists for a structure of a solenoid valve attached to a resin cover by insert-molding, which is not susceptible to the drawback mentioned above.

SUMMARY

According to an aspect of this disclosure, a structure of a solenoid valve attached to a resin cover by insert-molding, the solenoid valve includes a valve body having a cylindrical shape and at least two fluid passages, a spool housed in the valve body and slidable therein in an axial direction relative to the valve body, a solenoid for actuating the spool, wherein a plurality of flanges is provided on an outer peripheral surface of the valve body, and at least one of the flanges has a through hole formed in the axial direction relative to the valve body.

According to another aspect of this disclosure, a structure of a solenoid valve attached to a resin cover by insert-molding, the solenoid valve includes a sleeve having a cylindrical shape and at least two fluid passages, a spool housed in the sleeve and slidable therein in an axial direction relative to the sleeve, a solenoid for actuating the spool, wherein a valve body is provided on an outer peripheral surface of the sleeve and has a plurality of fluid passages that is in fluid communication with the fluid passages of the sleeve, a plurality of flanges is provided on an outer peripheral surface of the valve body, and at least one of the flanges has a through hole formed in the axial direction relative to the valve body.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
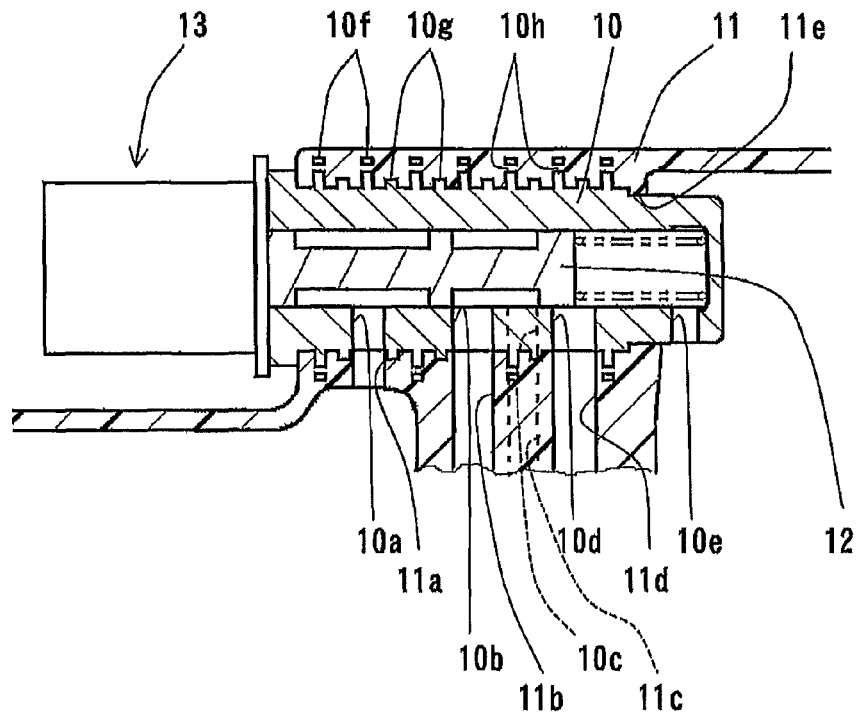
FIG. 1 is a cross-sectional view of a structure of a solenoid valve attached to a resin cover by insert-molding according to a first embodiment disclosed here.
Figure 2:
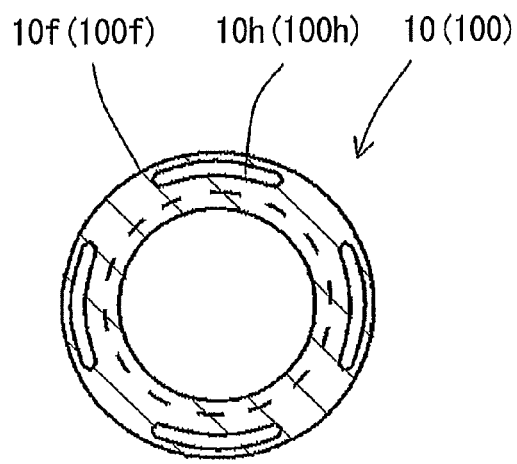
FIG. 2 is a cross-sectional view of a valve body according to the first embodiment disclosed here.

A first embodiment of a structure of a solenoid valve attached to a resin cover by insert-molding disclosed here will be explained with reference to FIGS. 1 and 2.

A solenoid valve of the first embodiment has a valve body 10 having a cylindrical shape, five fluid passages 10a, 10b, 10c, 10d, 10e, a spool 12 slidably housed in the valve body 10, and a solenoid portion 13 (serving as a solenoid) for axially moving the spool 12.

The valve body 10 is made of metal such as aluminum alloy and has the cylindrical shape. The five fluid passages 10a, 10b, 10c, 10d, 10e are provided on an outer peripheral surface of the valve body 10 to allow the fluid to flow between an inside and an outside of the valve body 10. Flanges 10f, 10g are provided on the outer peripheral surface of the valve body 10 so as to extend in a circumferential direction of the valve body 10 and to outwardly protrude in a radial direction of the valve body 10. The plural flanges 10f, 10g are arranged along an axial direction relative to the valve body 10.

A cylinder head cover 11 (serving as a resin cover) is made of a resin material and provided with an accommodating hole 11e for accommodating therein the valve body 10. The cylinder head cover 11 is also provided with fluid passages 11a, 11b, 11c, 11d arranged so as to correspond to locations of the fluid passages 10a, 10b, 10c, 10d provided on the valve body 10.

The spool 12 is provided inside the valve body 10. A sliding motion of the spool 12 in the axial direction relative to the valve body 10 establishes or disconnects the flow of the fluid between the fluid passages 10a, 10b, 10c, 10d, 10e. In FIG. 1, the flow of the fluid between the fluid passages 10b, 11b and the fluid passages 10c, 11c is established. Another flow of the fluid between the fluid passages 10a, 11a and the fluid passages 10b, 11b is disconnected. Another flow of the fluid between the fluid passages 10d, 11d and the fluid passage 10e is established. The spool 12 is connected to the solenoid portion 13, and the solenoid portion 13 actuates, or drives, the spool 12 to move, or to slide, in the axial direction relative to the valve body 10 when a control signal is sent from an ECU to the solenoid portion 13.

The solenoid portion 13 is fixedly mounted on one axial end of the valve body 10 with a fastener, for example, a bolt, or by means of caulking.

Next, the flanges 10f, 10g provided on the outer peripheral surface of the valve body 10 will be described.

As previously described, the flanges 10f, 10g are provided on the outer peripheral surface of the valve body 10 along the circumferential direction of the valve body 10. The plural flanges 10f, 10g are arranged along the axial direction relative to the valve body 10. The flange 10f outwardly protrudes in the radial direction of the valve body 10 further than the flange 10g outwardly protrudes in the radial direction of the valve body 10. The flanges 10f and 10g are alternately arranged in the axial direction relative to the valve body 10. The flange 10f is provided with a through hole 10h penetrating the flange 10f in the axial direction relative to the valve body 10 and having an oval shape when viewed from the axial direction of the valve body 10. In this embodiment, four through holes 10h, 10h, 10h, 10h are formed on the flange 10f along a circumferential direction of the flange 10f.

According to the above-described structure of the solenoid valve attached to the resin cover by insert-molding of this embodiment, when insert-molding the valve body 10 into the cylinder head cover 11, that is, when molding the cylinder head cover 11 by using the valve body 10 as an insert, that is, an object to be insert-molded, molten resin which later hardens and forms the cylinder head cover 11 flows and fills between the adjacent flanges 10f and 10g. Thus, both side surfaces of each of the flanges 10f, 10g in the axial direction relative to the valve body 10 are in close contact with (adhere to) the cylinder head cover 11. This prevents the cylinder head cover 11 and the valve body 10 from coming apart from each other even when the cylinder head cover 11 and the valve body 10 are made of different materials, and thus when thermal expansion coefficients are different between the two materials.

The flange 10f is provided with the through hole 10h penetrating the flange 10f in the axial direction relative to the valve body 10. Thus, the molten resin flows and fills in the through hole 10h when the cylinder head cover 11 is molded by using the valve body 10 as the insert. Consequently, the flange 10f and the cylinder head cover 11 are securely fixed to each other, that is, the cylinder head cover 11 encloses and supports the flange 10f. This prevents the cylinder head cover 11 and the valve body 10 from coming apart from each other even when the cylinder head cover 11 and the valve body 10 are made of the different materials, and thus when the thermal expansion coefficients are different between the two materials.

Because the flange 10f outwardly protrudes in the radial direction of the valve body 10 further than the flange 10g outwardly protrudes in the radial direction of the valve body 10, when the valve body 10 is insert-molded, the molten resin flows and fills in the through hole 10h provided on the flange 10f with no need to increase temperature of the molten resin or to increase an injection pressure, and at the same time, improper adhesion of the resin material to the valve body 10 and other inconvenience are prevented.

According to the structure of the solenoid valve attached to the resin cover by insert-molding of the first embodiment, the valve body 10 has a function of a sleeve constituting the solenoid valve. This achieves a simple structure that requires no seal material including an o-ring between the cylinder head cover 11 and the valve body 10.

Figure 3:
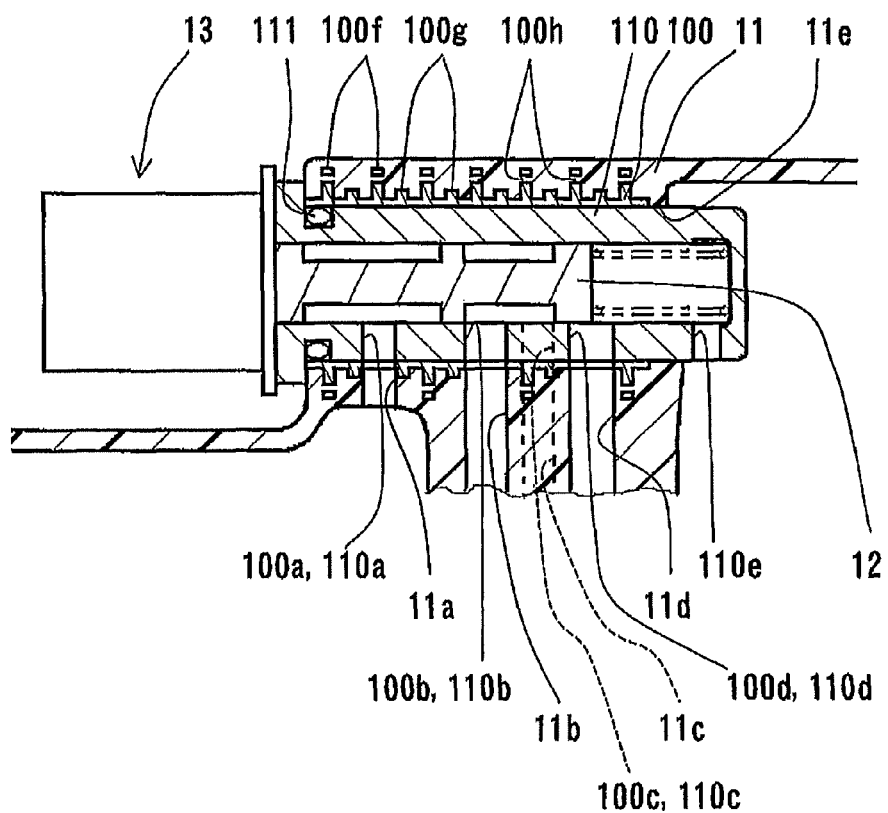
FIG. 3 is a cross-sectional view of a structure of a solenoid valve attached to a resin cover by insert-molding according to a second embodiment disclosed here.
Figure 4:
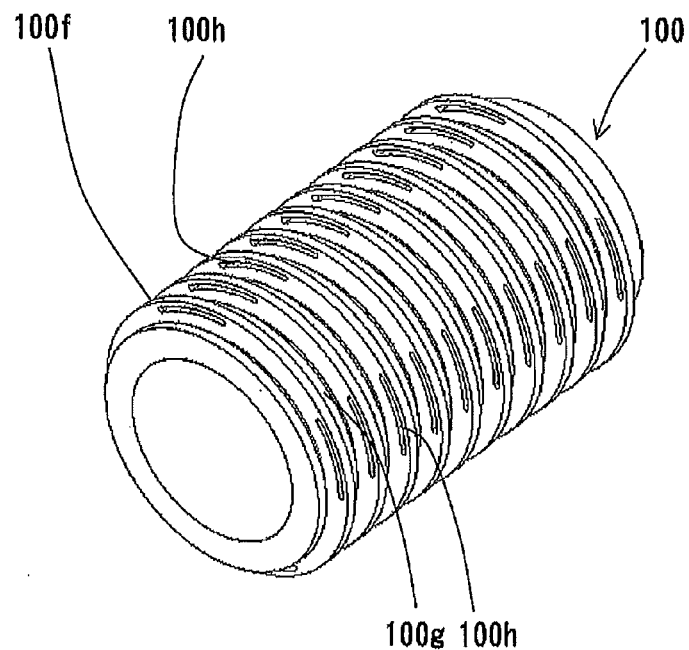
FIG. 4 is a perspective view of a valve body according to the second embodiment disclosed here.

A second embodiment of the structure of the solenoid valve attached to the resin cover by insert-molding disclosed here will be explained with reference to FIGS. 3 and 4. In the second embodiment, same reference numerals as in the first embodiment designate the same or corresponding components.

The solenoid valve of the second embodiment has a valve body 100 having a cylindrical shape and four fluid passages 100a, 100b, 100c, 100d, a sleeve 110 having five fluid passages 110a, 110b, 110c, 110d, 110e, a spool 12 slidably housed in the sleeve 110, and a solenoid portion 13 for axially moving the spool 12.

The valve body 100 is made of metal such as aluminum alloy and has the cylindrical shape. The four fluid passages 100a, 100b, 100c, 100d are provided on an outer peripheral surface of the valve body 100 to allow the fluid to flow between an inside and an outside of the valve body 100. Flanges 100f, 100g are provided on the outer peripheral surface of the valve body 100 so as to extend in a circumferential direction of the valve body 100 and to outwardly protrude in a radial direction of the valve body 100. The plural flanges 100f, 100g are arranged along an axial direction relative to the valve body 100.

The sleeve 110 is made of metal such as the aluminum alloy and has the cylindrical shape. The five fluid passages 110a, 110b, 110c, 110d, 110e are provided on an outer peripheral surface of the sleeve 110 to allow the fluid to flow between an inside and an outside of the sleeve 110. The fluid passages 110a, 110b, 110c, 110d of the sleeve 110 are arranged so as to correspond to locations of the previously-described fluid passages 100a, 100b, 100c, 100d of the valve body 100, thereby establishing fluid communication between the corresponding fluid passages. An outer diameter of the sleeve 110 is set to be equal to an inner diameter of the valve body 100 so that an outer peripheral surface of the sleeve 110 and an inner peripheral surface of the valve body 100 contact with each other.

An o-ring 111 is attached to the outer peripheral surface of the sleeve 110, on an opening side of the accommodating hole 11e. The o-ring 111 is provided for preventing the fluid from leaking from the inside of the solenoid valve to the outside thereof via a minute gap between the valve body 100 and the sleeve 110.

The valve body 100 and the sleeve 110 may be made of the materials having the substantially equal thermal expansion coefficients. This prevents the gap between the valve body 100 and the sleeve 110 from being increased upon thermal expansion of the valve body 100 or the sleeve 110 due to heat of the fluid or heat conducted from outside, for example, an internal combustion engine. Even when the valve body 100 and the sleeve 110 are made of different materials, it is desirable that the materials have the equal thermal expansion coefficients or substantially equal thermal expansion coefficients (thermal expansion coefficients close to each other). In this case, a range of difference in the thermal expansion coefficients needs to be narrow enough at least to prevent the fluid from leaking outside the solenoid valve via the gap between the valve body 100 and the sleeve 110, through the o-ring 111.

A cylinder head cover 11 is made of a resin material and provided with an accommodating hole 11e for accommodating therein the valve body 100 and the sleeve 110. The cylinder head cover 11 is also provided with fluid passages 11a, 11b, 11c, 11d arranged so as to correspond to locations of the fluid passages 100a, 100b, 100c, 100d provided on the valve body 10.

The spool 12 is provided inside the sleeve 110. A sliding motion of the spool 12 in an axial direction relative to the sleeve 110 establishes or disconnects the flow of the fluids between the fluid passages 100a, 100b, 100c, 100d, 100e. In FIG. 3, the flow of the fluid between the fluid passages 100b, 110b, 11b and the fluid passages 100c, 110c, 11c is established. Another flow of the fluid between the fluid passages 100a, 110a, 11a and the fluid passages 100b, 110b, 11b is disconnected. Another flow of the fluid between the fluid passages 100d, 110d, 11d and the fluid passage 110e is established. The spool 12 is connected to the solenoid portion 13, and the solenoid portion 13 actuates the spool 12 to move, or slide, in the axial direction relative to the sleeve 110 when a control signal is sent from an ECU to the solenoid portion 13.

The solenoid portion 13 is fixedly mounted on one axial end of the sleeve 110 with a fastener, for example, a bolt or a rivet.

Next, the flanges 100f, 100g provided on the outer peripheral surface of the valve body 100 will be described.

As previously described, the flanges 100f, 100g are provided on the outer peripheral surface of the valve body 100 so as to extend in the circumferential direction of the valve body 100. The plural flanges 100f, 100g are arranged along the axial direction relative to the valve body 100. The flange 100f outwardly protrudes in the radial direction of the valve body 100 further than the flange 100g outwardly protrudes in the radial direction of the valve body 100. The flange 100f and 100g are alternately arranged in the axial direction relative to the valve body 100. The flange 100f is provided with a through hole 100h penetrating the flange 100f in the axial direction relative to the valve body 100 and having an oval shape when viewed from the axial direction of the valve body 100. In this embodiment, the four through holes 100h, 100h, 100h, 100h are formed on the flange 100f.

According to the above-described structure of the solenoid valve attached to the resin cover by insert-molding of this embodiment, the molten resin which later hardens and forms the cylinder head cover 11 flows and fills between the adjacent flanges 100f and 100g upon molding the cylinder head cover 11 by using the valve body 10 as an insert. Thus, both side surfaces of each of the flanges 100f, 100g in the axial direction relative to the valve body 100 are in close contact with (adhere to) the cylinder head cover 11. This prevents the cylinder head cover 11 and the valve body 100 from coming apart from each other even when the cylinder head cover 11 and the valve body 100 are made of different materials, and thus when the thermal expansion coefficients are different between the two materials.

The flange 100f is provided with the through hole 100h passing through the flange 100f in the axial direction relative to the valve body 100. Thus, the molten resin which later hardens and forms the cylinder head cover 11 flows and fills in the through hole 100h when the valve body 100 is insert-molded. Consequently, the flange 100f and the cylinder head cover 11 are securely fixed to each other, that is, the cylinder head cover 11 encloses and supports the flange 100f. This prevents the cylinder head cover 11 and the valve body 100 from coming apart from each other even when the cylinder head cover 11 and the valve body 100 are made of the different materials, and thus when the thermal expansion coefficients are different between the two materials.

Because the flange 100f outwardly protrudes in the radial direction of the valve body 100 further than the flange 100g outwardly protrudes in the radial direction of the valve body 100, when the valve body 100 is insert-molded, the molten resin flows and fills in the through hole 100h provided on the flange 100f with no need to increase temperature of the molten resin or to increase an injection pressure, at the same time, improper adhesion of the resin material to the valve body 100 and other inconvenience are prevented.

In the first and second embodiments, the flanges 10f, 10g, 100f, 100g are formed to have an axial cross section of a three-sided rectangular shape, however, this disclosure is not limited to the three-sided rectangular shape, and other shapes including a semicircular shape or a V-shape may be employed.

The variations of the through holes 10h (100h), which will be described below with reference to FIGS. 5 to 8, apply both to the first and second embodiments.

Figure 5:
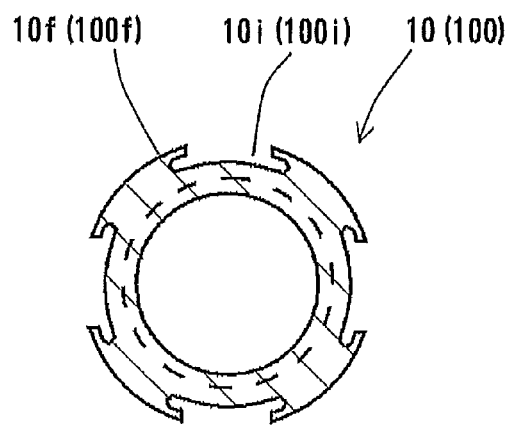
FIG. 5 is a cross-sectional view of a variation of a through hole according to the embodiments disclosed here.

As shown in FIG. 5, the flange 10f (100f) of the valve body 10 (100) is provided with a through hole 10i (100i) where a portion of a perimeter of the through hole 10i (100i) is interrupted so that the through hole 10i (100i) is opened outwardly in the radial direction of the flange 10f (100f). That is, a cross section of the through hole 10i (100i) has a shape that is opened outwardly in the radial direction of the flange 10f (100f). In other words, the cross section of the through hole 10i (100i) is no longer the perfect oval shape. This allows the molten resin to efficiently flow and fill in the through hole 10i (100i) when the valve body 10 (100) is insert-molded. Consequently, this reliably prevents the cylinder head cover 11 and the valve body 10 (100) from coming apart from each other.

Figure 6:
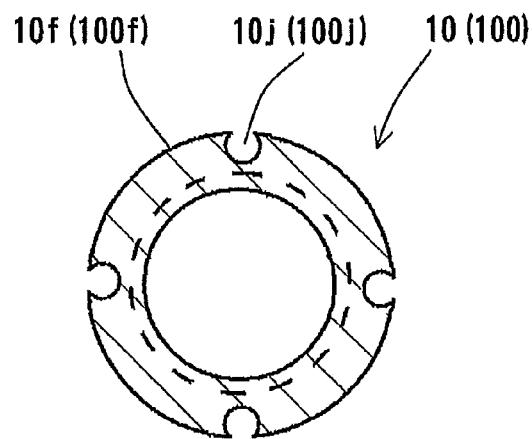
FIG. 6 is a cross-sectional view of another variation of the through hole according to the embodiments disclosed here.

As shown in FIG. 6, the flange 10f (100f) of the valve body 10 (100) is provided with a through hole 10j (100j) having a circular shape in cross section. In addition, a portion of a perimeter of the through hole 10j (100j) is interrupted so that the through hole 10j (100j) is opened outwardly in the radial direction of the flange 10f (100f). That is, a cross section of the through hole 10j (100j) has a shape that is opened outwardly in the radial direction of the flange 10f (100f). In other words, the cross section of the through hole 10j (100j) is no longer the perfect circular shape. This allows the through hole 10j (100j) to be formed in a simple machining process, and the molten resin to flow and fill in the through hole 10j (100j) efficiently when the valve body 10 (100) is insert-molded. Consequently, this reliably prevents the cylinder head cover 11 and the valve body 10 (100) from coming apart from each other.

Figure 7:
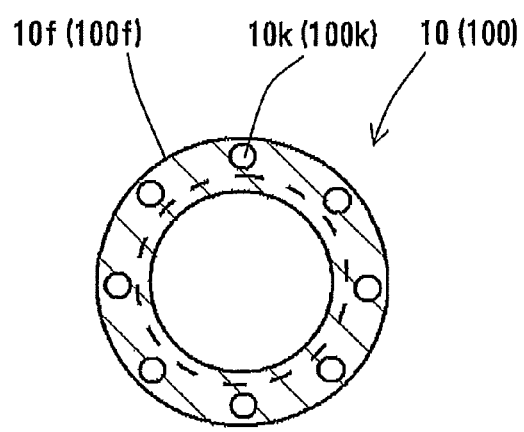
FIG. 7 is a cross-sectional view of another variation of the through hole according to the embodiments disclosed here.

As shown in FIG. 7, a through hole 10k (100k) has a circular shape in cross section. Thus, the through hole 10k (100k) is formed in the simple machining process.

Figure 8:
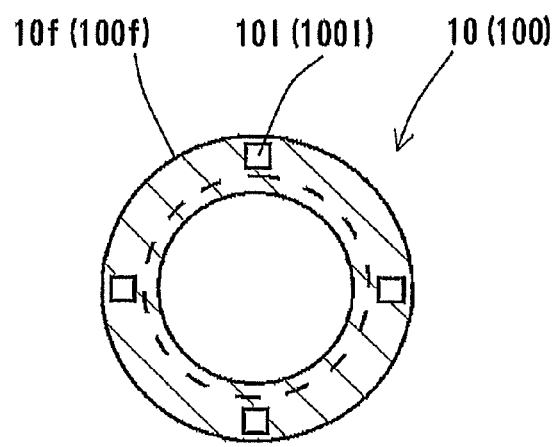
FIG. 8 is a cross-sectional view of another variation of the through hole according to the embodiments disclosed here.

As shown in FIG. 8, a through hole 10l (100l) has a polygon shape, for example a quadrangle shape, in section. Thus, the through hole 10k (100k) is formed in the simple machining process.

According to the first embodiment, when the valve body 10 is insert-molded, the molten resin efficiently flows and fills in the through holes 10h, 10i, 10j, 10k, 10l provided on the flanges 10f so as to adhere to the flanges 10f, 10g, that is, to be in contact with the flanges 10f, 10g, thereby preventing the cylinder head cover 11 and the valve body 10 from coming apart from each other.

According to the first embodiment, the valve body 10 has the function of the sleeve that constitutes the solenoid valve.

This achieves the simple structure that requires no seal material including the o-ring between the cylinder head cover 11 and the valve body 10.

According to the second embodiment, when the valve body 100 is insert-molded, the molten resin efficiently flows and fills in the through holes 100h, 100i, 100j, 100k, 100l provided on the flanges 100f so as to adhere to the flanges 100f, 100g, thereby preventing the cylinder head cover 11 and the valve body 100 from coming apart from each other.

According to the second embodiment, the sleeve 110 constituting the solenoid valve and the valve body 100 used as the insert upon molding the cylinder head cover 11 are provided separately. This allows, when the solenoid valve is damaged, an easy replacement of the solenoid valves by removing a portion of the solenoid valve including the sleeve 110 from the valve body 100, and then attaching the new portion of the solenoid valve including the new sleeve 110. Thus, the cylinder head cover 11 and the valve body 100 may be used as they are, that is, the cylinder head cover 11 and the valve body 100 do not require alternation, which saves replacement parts and improves replacement workability.

According to the second embodiment, the material of the sleeve 110 and the material of the valve body 100 have substantially same thermal expansion coefficients.

This prevents the gap between the valve body 100 and the sleeve 110 from being increased upon the thermal expansion of the valve body 100 or the sleeve 110 due to the heat of the fluid or the heat conducted from outside, for example, the internal combustion engine. Consequently, the unintentional fluid communication between the two fluid passages and fluid leakage to the outside of the solenoid valve are prevented.

According to the embodiments, the cylinder head cover 11 encloses and supports at least the flanges 10f, 10g, 100f, 100g of the valve body 10, 100.

According to the embodiments, the outer diameter of the at least one of the flanges 10f, 10g, 100f, 100g is larger than the outer diameter of the other flanges 10f, 10g, 100f, 100g.

Consequently, when the valve body 10, 100 is insert-molded, the molten resin flows and fills in the through holes 10h, 10i, 10j, 10k, 10l, 100h, 100i, 100j, 100k, 100l with small likelihood of being blocked by the other flanges 10f, 10g, 100f, 100g. Consequently, the improper adhesion of the resin material to the valve body 10 and other inconvenience are prevented without increasing the temperature of the molten resin which later hardens and forms the cylinder head cover 11 or increasing the injection pressure.

According to the embodiments, the plural through holes 10h, 10i, 10j, 10k, 10l, 10h, 100i, 100j, 100k, 100l are formed along the circumferential direction of the at least one of the flanges 10f, 10g, 100f, 100g.

Consequently, the flanges 10f, 10g, 100f, 100g and the valve body 10, 100 are securely fixed to each other at larger areas, thereby preventing the cylinder head cover 11 and the valve body 10, 100 from coming apart from each other.

According to the embodiments, the through hole 10i, 10j, 100i, 100j is opened outwardly in the radial direction of the flange 10f, 10g, 100f, 100g.

Consequently, the molten resin flows and fills in the through hole 10i, 10j, 100i, 100j efficiently.

According to the second embodiment, the through hole 100h has the oval shape in cross section.

Consequently, greater amount of molten resin flows and fills in the through hole 100h, and thus the flanges 100f, 100g and the cylinder head cover 11 are even more securely fixed to each other. This prevents the cylinder head cover 11 and the valve body 100 from coming apart from each other.

According to the second embodiment, the through hole 100k has the circular shape or the polygon shape in cross section.

Consequently, the through hole 100k is formed in the simple machining process.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A structure of a solenoid valve attached to a resin cover by insert-molding, the solenoid valve comprising:
   a sleeve having a cylindrical shape and at least two fluid passages;
   a spool housed in the sleeve and slidable therein in an axial direction relative to the sleeve; and
   a solenoid for actuating the spool; wherein
   a valve body is provided on an outer peripheral surface of the sleeve and has a plurality of fluid passages that is in fluid communication with the fluid passages of the sleeve,
   a plurality of flanges is provided on an outer peripheral surface of the valve body, and at least one of the flanges has a through hole formed in the axial direction relative to the valve body, and
   the plurality of flanges includes a first flange and a second flange positioned at opposite axial ends of the valve body, the first and second flanges being embedded in the resin cover during insert-molding of the resin cover, the first flange possessing a first through hole extending in the axial direction through the first flange, the second flange possessing a second through hole extending in the axial direction through the second flange.

2. The structure of the solenoid valve attached to the resin cover by insert-molding according to claim 1, wherein a material of the sleeve and a material of the valve body have substantially same thermal expansion coefficients.

3. The structure of the solenoid valve attached to the resin cover by insert-molding according to claim 1, wherein the resin cover encloses and supports at least the flanges of the valve body.

4. The structure of the solenoid valve attached to the resin cover by insert-molding according to claim 3, wherein an outer diameter of the at least one of the flanges is larger than an outer diameter of the other flanges.

5. The structure of the solenoid valve attached to the resin cover by insert-molding according to claim 3, wherein a plurality of the through holes is formed along a circumferential direction of the at least one of the flanges.

6. The structure of the solenoid valve attached to the resin cover by insert-molding according to claim 5, wherein the through hole is opened outwardly in a radial direction of the flange.

7. The structure of the solenoid valve attached to the resin cover by insert-molding according to claim 1, wherein an outer diameter of the at least one of the flanges is larger than an outer diameter of the other flanges.

8. The structure of the solenoid valve attached to the resin cover by insert-molding according to claim 1, wherein a plurality of the through holes is formed along a circumferential direction of the at least one of the flanges.

9. The structure of the solenoid valve attached to the resin cover by insert-molding according to claim 8, wherein the through hole is opened outwardly in a radial direction of the flange.

10. The structure of the solenoid valve attached to the resin cover by insert-molding according to claim 1, wherein the through hole has an oval shape in cross section.

11. The structure of the solenoid valve attached to the resin cover by insert-molding according to claim 1, wherein the through hole has a circular shape in cross section.

12. The structure of the solenoid valve attached to the resin cover by insert-molding according to claim 1, wherein the through hole has a polygon shape in cross section.

13. A solenoid valve configured for attachment to a resin cover by insert-molding, the solenoid valve comprising:
- a cylindrical valve body possessing opposite axial ends and two fluid passages;
- a spool housed in the cylindrical valve body and movable relative to the cylindrical valve body in the axial direction;
- a solenoid configured to move the spool;
- a first flange and a second flange protruding from an outer peripheral surface of the cylindrical valve body and positioned at respective opposite axial ends of the cylindrical valve body, the first and second flanges being embedded in the resin cover during insert-molding of the resin cover;
- a first through hole extending in the axial direction through the first flange, the first through hole being filled with a portion of the resin cover during insert-molding of the resin cover; and
- a second through hole extending in the axial direction through the second flange, the second through hole being filled with a portion of the resin cover during insert-molding of the resin cover.

14. The solenoid valve of claim 13, further comprising a cylindrical sleeve positioned between the cylindrical valve body and the spool.

15. The solenoid valve of claim 13, further comprising a plurality of third and fourth flanges protruding from the outer peripheral surface of the cylindrical valve body and positioned between the first flange and the second flange, the third flanges possessing a through hole and the fourth flanges being devoid of a through hole, the third flanges and the fourth flanges being alternately arranged in the axial direction so that every other flange possesses a through hole.

16. A structure of a solenoid valve attached to a resin cover by insert-molding, the solenoid valve comprising:
- a sleeve having a cylindrical shape and at least two fluid passages;
- a spool housed in the sleeve and slidable therein in an axial direction relative to the sleeve; and
- a solenoid for actuating the spool; wherein
- a valve body is provided on an outer peripheral surface of the sleeve and has a plurality of fluid passages that is in fluid communication with the fluid passages of the sleeve,
- a plurality of flanges is provided on an outer peripheral surface of the valve body, and at least one of the flanges has a through hole formed in the axial direction relative to the valve body, and
- the plurality of flanges includes first flanges possessing a through hole and second flanges devoid of a through hole, the first flanges and the second flanges being alternately arranged so that every other flange in the axial direction possesses a through hole.

* * * * *